United States Patent
Scandurra et al.

(10) Patent No.: US 8,401,388 B2
(45) Date of Patent: Mar. 19, 2013

(54) OPTICAL TRANSMITTER

(75) Inventors: Alberto Scandurra, Messina (IT); Mirko Dondini, Catania (IT); Salvatore Pisasale, Catania (IT); Letizia Fragomeni, Gerace (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 376 days.

(21) Appl. No.: 12/790,662

(22) Filed: May 28, 2010

(65) Prior Publication Data

US 2010/0322625 A1    Dec. 23, 2010

(30) Foreign Application Priority Data

Jun. 22, 2009 (IT) .............................. TO2009A0472
Jun. 22, 2009 (IT) .............................. TO2009A0473

(51) Int. Cl.
*H04J 14/02* (2006.01)
(52) U.S. Cl. .......................................... 398/75; 398/91
(58) Field of Classification Search ................ 398/75, 398/91

See application file for complete search history.

(56) References Cited

U.S. PATENT DOCUMENTS

| | | | |
|---|---|---|---|
| 7,352,301 B2 | 4/2008 | Pappalardo et al. | |
| 2004/0228629 A1 | 11/2004 | Harris et al. | |
| 2007/0172235 A1 | 7/2007 | Snider et al. | |
| 2008/0084862 A1 | 4/2008 | Oliver | |
| 2008/0205889 A1* | 8/2008 | Aoki ............................... | 398/51 |

FOREIGN PATENT DOCUMENTS

| | | |
|---|---|---|
| EP | 1 445 975 A2 | 8/2004 |
| EP | 1 524 810 A1 | 4/2005 |
| EP | 1 806 878 A1 | 7/2007 |

OTHER PUBLICATIONS

U.S. Appl. No. 12/790,659, filed May 28, 2010, 32 pages.
Chao et al., "An Optical Interconnection Network for Terabit IP Routers," Journal of Lightwave Technology, 18 (12):2095-2112, Dec. 2000.
Das et al., "QoS Performance of OBS in WDM/TDM Networks," Proceedings of the IEEE International Conference on Wireless and Optical Communications Networks, Piscataway, New Jersey, Apr. 28, 2009, pp. 1-5.

(Continued)

*Primary Examiner* — Leslie Pascal
(74) *Attorney, Agent, or Firm* — Seed IP Law Group PLLC

(57) ABSTRACT

A transmitter for generating, starting from a data-packet traffic at input, flows of information to be conveyed via optical signals with different wavelengths towards a plurality of targets in a communications network, the transmitter including: a destination decoder to identify, for each packet in the input packet traffic, a respective destination target in the plurality of targets; a plurality of emitter modules operating at different wavelengths for converting the electrical signals into optical signals; and a de-multiplexer, which is controlled by the destination decoder and is able to drive the emitter modules by sending selectively to each emitter module the electrical signals corresponding to a given packet of the input packet traffic according to the respective destination target identified by the destination decoder. A serialization module is set upstream of the de-multiplexer for converting the packet traffic into a serial flow of bits. The transmitter also includes an optional transmission optical bus inverter for implementing a source coding on the electrical signals sent to the emitter modules.

28 Claims, 5 Drawing Sheets

OTHER PUBLICATIONS

Matsuura et al., "Packet-by-packet wavelength-routing interconnect technique for 5 Tbit/s switching system," Electronics Letters, 38(2), Jan. 17, 2002, 2 pages.

Wu et al., "Architecture for Two-way Data Services Over Residential Area CATV Networks," Proceedings of the Sixteenth Annual Joint Conference of the IEEE Computer and Communications Societies: Driving the Information Revolution, Kobe, Japan, Apr. 7-11, 1997, vol. 3, pp. 1157-1164.

Wydrowski et al., "QoS in Best-Effort Networks," IEEE Communications Magazine, pp. 44-49, Dec. 2002.

Yamakoshi et al., "5-Tb/s Frame-based ATM Switching System using 2.5-Gb/s X 8-λ Optical Switching Technique," IEEE Workshop on High Performance Switching and Routing, Piscataway, New Jersey, May 29-31, 2001, pp. 88-92.

* cited by examiner

OPTICAL TRANSMITTER

BACKGROUND

1. Technical Field

The disclosure relates to optical transmitters and has been developed with particular attention paid to the possible application to micro-architectures of optical transmitters used in networks that exploit optical interconnections for connection between Intellectual Property (IP) cores.

2. Description of the Related Art

The techniques for producing optical transmitters and receivers form the subject of an extensive scientific and technical literature, also of a patent type.

BRIEF SUMMARY

Current literature does not appear to be aimed appreciably at micro-architectures for optical transmitters that can be used both in systems-on-chip and in systems-off-chip. In one embodiment, a type of optical transmitters can be used indifferently both in on-chip applications and in off-chip ones.

The object of an embodiment of the disclosure is to provide a transmitter that will be able to solve the aforesaid problems.

In one embodiment, a transmitter is responsible for generating the traffic requests to be forwarded to the optical network, regardless of whether it is a network-on-chip or a network-off-chip.

In one embodiment, the transmitter receives the operation requests coming from the interfaces of the traffic sources and, after some treatments and/or conversions, generates electrical signals used for driving the light-emitter modules (lasers) or the light modulators, transferring information in the form of light to the on-chip or off-chip optical network.

In one embodiment, the transmitter is used in an optical network of a CMOS-compatible type, where the network is based upon a wavelength-division-multiplexing (WDM) technique.

Another typical off-chip application of an embodiment is represented by die-to-die communication (System-in-Package) or by package-to-package communication (System-on-Board).

In one embodiment, a transmitter comprises: a destination decoder configured to identify, for packets in packet traffic received in input, a respective destination target in a plurality of targets in a communication network; a plurality of emitting modules configured to convert electrical signals into optical signals of different wavelengths; and a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder. In one embodiment, the transmitter includes a serialization module provided upstream of said de-multiplexer and configured to transform the packet traffic into a serial stream of bits. In one embodiment, the transmitter includes an optical bus inverter transmitter to implement a source coding on the electrical signals sent to said emitting modules. In one embodiment, said optical bus inverter includes: an inversion module configured to invert the signal received in input; a comparator module configured to: compare the signal received in input with the inverted signal present at the output of said inversion module; choose as the signal to be transmitted the compared signal that contains a lower number of bits at a logic level "1"; and outputting an inversion signal, whose logic level is indicative of the signal to be transmitted; and a selector module configured to outputting the signal indicated by said inversion signal. In one embodiment, said comparator module performs the comparison between the signals along a following criteria: if the signal to be transmitted was digitized from a most significant bit, then each bit is analyzed; while the analyzed bits are at the logic level "0", nothing happens and scanning continues; once a bit at a logic level "1" is detected, this bit is left unchanged and is considered as a marker; from a next bit to an end of the scanning, all bits are inverted. In one embodiment, said emitting modules comprise an optical emitter driven by a driver including: a differential stage with two MOSFET transistors to modulate a current of the optical emitter based on a potential difference between an input voltage and a reference voltage; and a stage configured to generate the reference voltage comprising two MOSFET transistors arranged in cascade with gate and drain terminals in common. In one embodiment, said optical emitter comprises a laser diode. In one embodiment, said laser diode is biased with a current greater than a current threshold in order to address an ignition delay. In one embodiment, said transmitter is a system on-chip. In one embodiment, said targets are included in on-chip and off-chip systems.

In one embodiment, a system comprises: a communication network having a plurality of targets; and an optical transmitter comprising: means for identifying, for packets in packet traffic received in input, a respective destination target in the plurality of targets; means for converting electrical signals into optical signals of different wavelengths; and means for driving the means for converting based on the identifying. In one embodiment, the optical transmitter further comprises means for transforming packets in the packet traffic into serial streams of bits, coupled to the means for driving. In one embodiment, the optical transmitter further includes means for implementing a source coding on the electrical signals. In one embodiment, the means for implementing a source coding comprises: an inversion module configured to invert a signal received in input; a comparator module configured to: compare the signal received in input with the inverted signal present at the output of said inversion module; choose as a signal to be transmitted the compared signal that contains a lower number of bits at a logic level "1"; and outputting an inversion signal, whose logic level is indicative of the signal to be transmitted; and a selector module configured to outputting the signal indicated by said inversion signal. In one embodiment, the means for emitting comprises an optical emitter driven by a driver including: a differential stage with two MOSFET transistors to modulate a current of the optical emitter based on a potential difference between an input voltage and a reference voltage; and a stage configured to generate the reference voltage comprising two MOSFET transistors arranged in cascade with gate and drain terminals in common. In one embodiment, the optical emitter comprises a laser diode. In one embodiment, the means for emitting further comprises means for addressing an ignition delay. In one embodiment, the optical transmitter is an on-chip transmitter and the targets include on-chip and off-chip targets.

In one embodiment, a system comprises: a communication network having a plurality of targets; and an optical transmitter comprising: a destination decoder configured to identify, for packets in packet traffic received in input, a respective destination target in the plurality of targets; a plurality of emitting modules configured to convert electrical signals into optical signals of different wavelengths; and a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder. In one embodiment, the transmitter includes a serialization module provided upstream of said de-multiplexer and configured to transform the packet traffic into a serial stream of bits. In one embodiment, the transmitter includes an optical bus inverter transmitter to implement a source coding on the electrical signals sent to said emitting modules. In one embodiment, the emitting modules comprise an optical emitter driven by a driver including: a differential stage with two MOSFET transistors to modulate a current of the optical emitter based on a potential difference between an input voltage and a reference voltage; and a stage configured to generate the reference voltage comprising two MOSFET transistors arranged in cascade with gate and drain terminals in common. In one embodiment, said optical emitter comprises a laser diode. In one embodiment, the transmitter is a system on-chip. In one embodiment, said targets include on-chip and off-chip targets.

In one embodiment, a method comprises: using an on-chip optical transmitter to: identify, for packets in packet traffic received in input, a respective destination target in a plurality of targets in a communication network; convert electrical signals into optical signals of different wavelengths; and control the conversion of a packet based on the identification of the respective destination target. In one embodiment, the method further comprises transforming packets in the packet traffic into serial streams of bits. In one embodiment, the method further comprises implementing a source coding on the electrical signals prior to conversion of the electrical signals into optical signals. In one embodiment, the plurality of targets includes on-chip and off-chip targets.

BRIEF DESCRIPTION OF THE SEVERAL VIEWS OF THE DRAWINGS

Embodiments of the disclosure will now be described, purely by way of non-limiting example, with reference to the annexed representations, wherein.

DETAILED DESCRIPTION

Illustrated in the ensuing description are various specific details aimed at an in-depth understanding of the embodiments. The embodiments can be provided without one or more of the specific details, or with other methods, components, materials, etc. In other cases, known structures, materials or operations are not illustrated or described in detail to prevent various aspects of the embodiments from being obscured.

Reference to "one embodiment" in the framework of this description is intended to indicate that a particular configuration, structure, or characteristic described in relation to the embodiment is comprised in at least one embodiment. Hence, phrases such as "in one embodiment", which may be present in different points of this description, do not necessarily refer to one and the same embodiment. Furthermore, particular conformations, structures or characteristics can be combined in an adequate way in one or more embodiments.

The references used herein are purely for convenience and hence do not define the sphere of protection or the scope of the embodiments.

Figure 1:
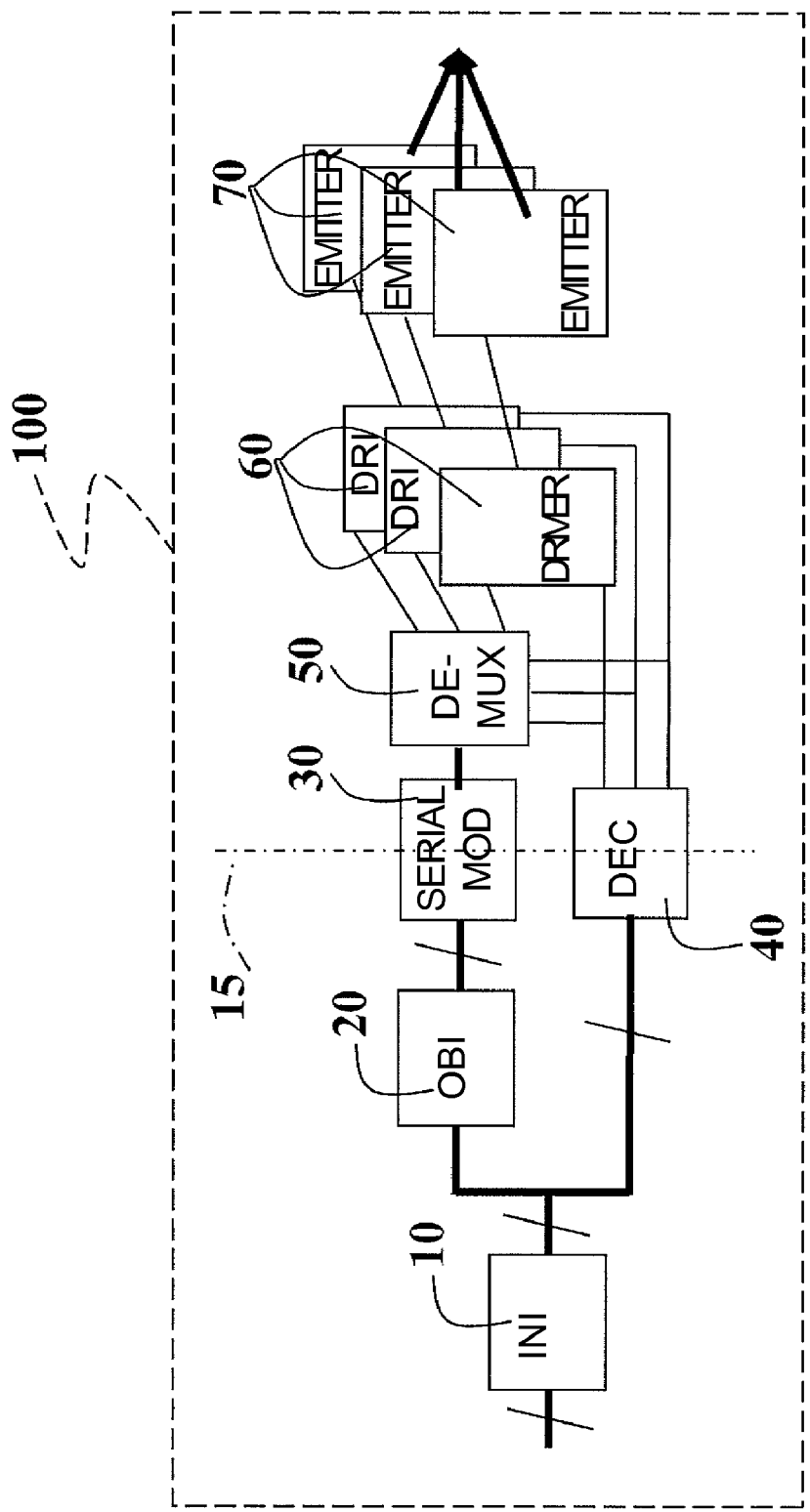
FIG. 1 shows an example of micro-architecture of an optical transmitter.

In the figures, parts, elements, or components that are identical or equivalent to parts, elements, or components already described with reference to FIG. 1 are designated by the same references unless the context indicates otherwise, thus rendering superfluous repetition of the corresponding description.

According to the costs and the energy constraints, the light-emitter module may be internal or external to the system. In the former case, there may be integration of lasers in the system; in the latter case, instead, optical modulators may be integrated within the system.

A typical on-chip application of an embodiment may be represented by the networks-on-chip (NoCs) that exploit optical connections based upon the wavelength-division-multiplexing (WDM) techniques for the physical layer.

A typical off-chip application of an embodiment may be represented by die-to-die communication (System-in-Package) or by package-to-package communication (System-on-Board).

The description refers to the micro-architecture of a transmitter of optical information that can be used both in networks-on-chip and in networks-off-chip.

FIG. 1 shows an example of embodiment of the micro-architecture of an optical transmitter 100. In the illustrated embodiment, it is possible to distinguish the following elements:

- a transmission initiator network interface (INI) 10;
- a transmission optical bus inverter (OBI) 20 connected to the interface 10;
- a serialization module 30 cascaded to the OBI 20;
- a destination decoder 40, which is also connected to the interface 10;
- a de-multiplexer 50 operating at the output of the module 30 under the control of the decoder 40;
- a plurality of driver modules 60, which are connected to the outputs of the de-multiplexer 50 and are also controlled by the decoder 40; and
- a plurality of emitter modules or modulators 70 driven by the modules 60.

With reference to FIG. 1, the optical signals are generated by the emitter modules 70 that form the opto-electronic portion of the transmitter circuit 100. In an embodiment, the emitter modules 70 are provided by laser diodes.

Present in FIG. 1 may be modules that are purely digital and others that are purely analog.

In particular, in the embodiment illustrated in FIG. 1, the analog modules are represented by the driver modules 60. Said driver modules 60 are configured to generate a modulated analog current that has the function of driving the laser modules 70 that act as light emitters.

In FIG. 1 the line 15 delimits two domains with different clock rates. The serialization module 30 acts as conversion module between the two rates. To the right of the line 15 there is a clock with a first rate f1 and the information is divided into packets of N bits, whilst to the left the clock has a second rate f2 equal to N*f1 and the information has been serialized at 1 bit.

The remaining modules of FIG. 1 are digital modules, and can be implemented for example as RTL-synthesizable modules (RTL: Register Transfer Level), for example through VHDL or Verilog. On account of the high-rate constraints of the optical domain, for some of them, in particular for the serialization module 30, recourse may be had to the implementation at a transistor level to meet any stringent requirements that may be imposed.

Hereinafter the functions of the main modules present in the transmitter of FIG. 1 will be described in detail.

The network-interface transmitter module 10 is responsible for conversion of the source traffic, generated according to the specifications of the IP protocol (STBus, AMBA AXI, OCP, etc.) into an intermediate format suitable for propagation and transformation in the communications network.

The optical-bus-inverter (OBI) transmitter module 20 implements a source-coding technique that enables reduction of the number of bits at the high level (i.e., at level "1"), within a packet, so as to keep the light emitter turned off as much as possible during transmission of information.

An example of source coding is described in US 2005/0281562 A1, assigned to the present applicant. In particular, said document regards a method for reducing the number of logic 1's that have to be transmitted on an optical connection in order to reduce the optical power transmitted to a minimum, keeping the emitter turned off as long as possible.

Figure 2A:
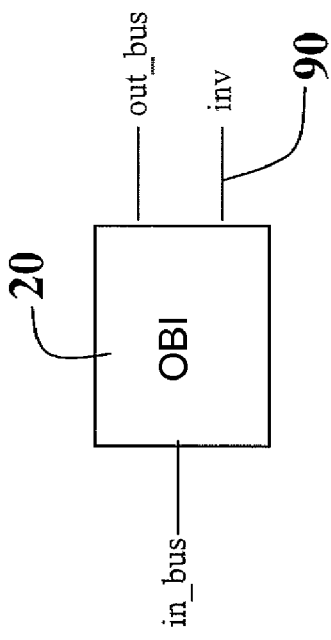
FIGS. 2a and 2b show an embodiment of an Optical-Bus-Inverter transmitter module.
Figure 2B:
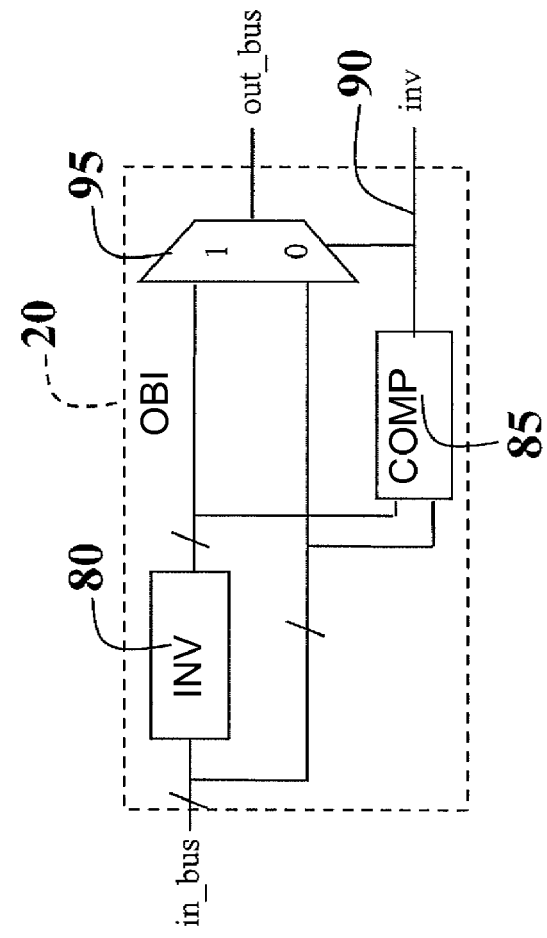

Operation of the OBI module 20, according to the diagram illustrated in FIGS. 2a and 2b, is described in what follows:
the signal to be transmitted in_bus is inverted by a provided inversion module 80;
a comparator module 85 compares the two signals, i.e., the direct signal in_bus with the inverted signal present at the output of the inversion module 80, to determine which signal contains the largest number of bits at the logic level "1"; the comparator module 85 emits at output a signal inv, designated by the reference number 90, which indicates which signal is to be transmitted;
according to the result of the comparison, the signal out_bus at output from the selector module 95 varies according to the value of the inversion signal 90: if the signal 90 is at the low level "0", the incoming signal is propagated unvaried, whereas, if the signal 90 is at the high level "1", the inverted signal is transmitted.

With this approach, the signal that is serialized contains the lowest number of bits at "1" so that the emitter will be kept turned on for as short a time as possible.

In an embodiment, the comparison is made according to the following criteria:
if the signal to be transmitted has been digitalized starting from the most significant bit, then each bit is analyzed;
as long as the bits analyzed are at the logic level "0", nothing happens and the scanning continues;
as soon as a bit at the logic level "1" is detected, said bit is left unvaried and is considered as a marker;
from the next bit up to the end of scanning, all the bits are inverted.

In this way, not all the signal is inverted; in fact, a possible chunk of the signal that contains only bits at the logic level "0" remains unvaried, in order to keep said positive characteristic of the signal, i.e., the presence of many bits at "0".

Table 1 below shows some examples of coding on an optical bus for an 8-bit bus.

TABLE 1

| Signal | # '1' | Coding | # '1' | Bus Value | inv | Gain |
|---|---|---|---|---|---|---|
| 00000000 | 0 | 00000000 | 0 | 00000000 | 0 | — |
| 11111111 | 8 | 10000000 | 1 | 10000000 | 1 | 88% |
| 10010010 | 3 | 11101101 | 6 | 10010010 | 0 | — |
| 11011101 | 6 | 10100010 | 3 | 10100010 | 1 | 50% |
| 00011011 | 4 | 00010100 | 2 | 00010100 | 1 | 50% |

TABLE 1-continued

| Signal | # '1' | Coding | # '1' | Bus Value | inv | Gain |
|---|---|---|---|---|---|---|
| 00001111 | 4 | 00001000 | 1 | 00001000 | 1 | 75% |
| 01010101 | 4 | 01101010 | 4 | 01010101 | 0 | — |
| 10101010 | 4 | 11010101 | 5 | 10101010 | 0 | — |
| 11111110 | 7 | 10000001 | 2 | 10000001 | 1 | 72% |

The serialization module 30 has the task of converting into a flow of serial bits the traffic generated by the network interface of the initiator typically divided into header and payload flit (flow control unit) packets.

The dimension of each packet is defined on the basis of the width of the physical channel (36|72|144 bits).

To compensate for the delay introduced by serialization, the output of the serialization module 30 may work at a very high rate thanks to a provided high-speed phase-lock loop (PLL).

The destination-decoder module 40 is responsible for identifying the targets that the traffic source wishes to achieve. Its inputs are represented by the requests of the sources and by the identifiers of the targets (i.e., the address of the destination memory in the case of a memory block), and its output is a signal that represents the requested module, conveniently represented by a one-hot coding.

In the case of use of the WDM technique, each target may be accessible by the source through a specific wavelength. The output of the destination-decoder module 40 is hence used for selecting, through the de-multiplexer 50, the corresponding driver 60 of the emitter 70, in order to generate optical traffic with the chosen wavelength.

The de-multiplexer module 50, being based upon the result of the destination decoder 40, i.e., upon the address selected, simply enables the correct path to be followed from the serialized output to the input of the driver of the emitter selected.

The task of the driver module 60 that drives the emitter 70 is to modulate correctly the biasing current of the laser source or the modulation current of the light modulator so as to generate light corresponding to the serial traffic to be transmitted through the optical waveguide.

Figure 3:
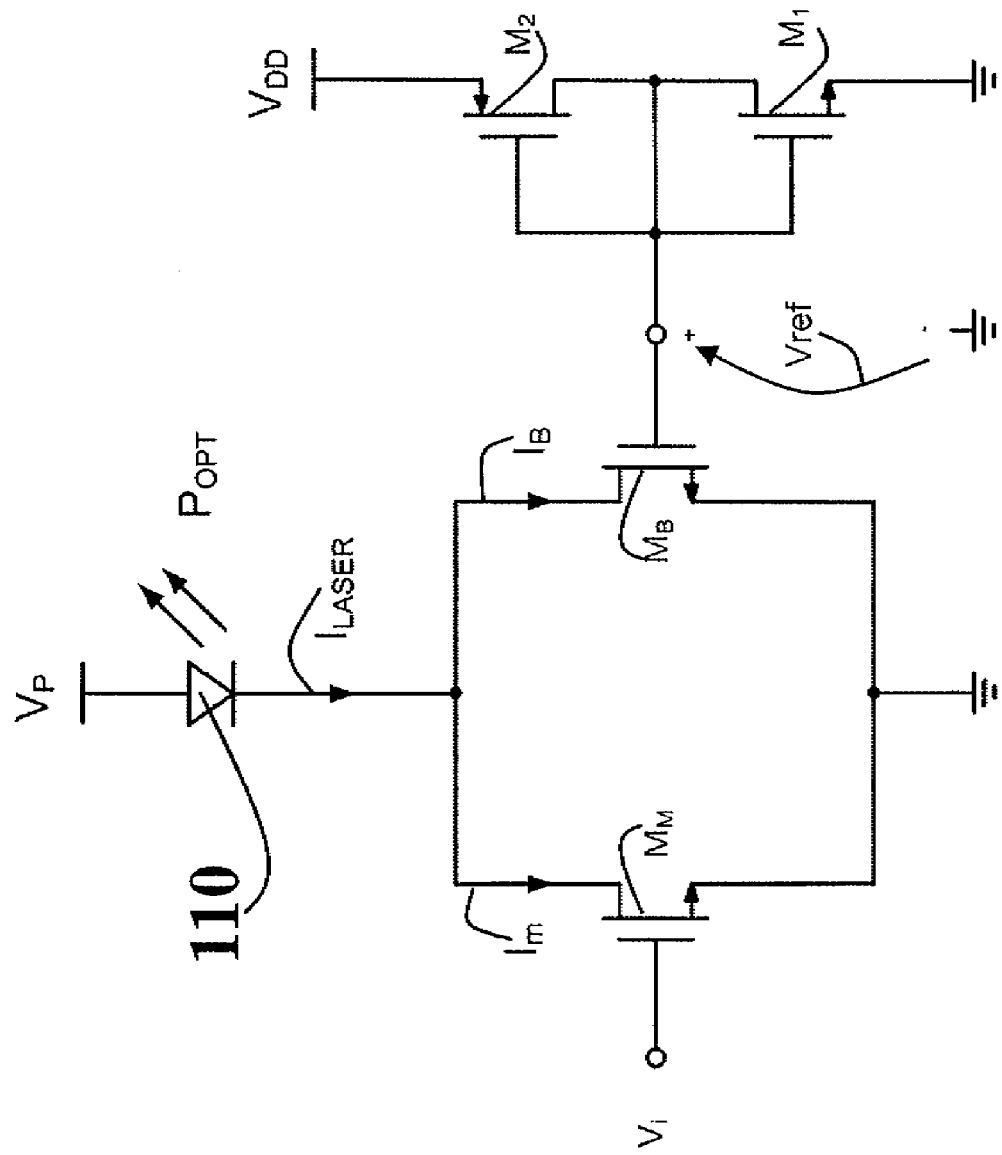
FIG. 3 shows an embodiment of a driver module.

In the case where the light emitter is provided via a laser source 70, the driver 60 is based upon a current-modulation scheme, such as, for example, the one illustrated in FIG. 3.

This scheme is based upon the result of the European-Commission project known as PICMOS (Photonic Interconnect Layer on Complementary Metal Oxide Semiconductor) with which the possibility of creating an entire optical connection on a nanophotonic-waveguide platform has been demonstrated.

In this case, the biasing of the laser source is obtained via a reference voltage Vref.

The driver circuit is made up of a differential stage that comprises two n-channel MOSFETs $M_M$ and $M_B$. The differential stage modulates the current $I_{LASER}$ on the basis of the potential difference between the input voltage V1 and the reference voltage Vref.

The laser source 110 is provided via a laser diode, which, appropriately biased, is traversed by the current $I_{LASER}$, equal to the sum of the currents that flow in the drains $I_m$ and $I_B$ of the two transistors $M_M$ and $M_B$ that form the differential stage.

The laser diode 110 emits a beam of light with a given wavelength that is a function of the energy gap between the bands of the semiconductor and of the modes of propagation of the optical cavity. Typically, the wavelength is not stable and changes in time as a function of the temperature and the current that traverses the laser diode.

The laser diode 110 is connected between a voltage reference $V_P$ and the differential stage.

The reference voltage Vref is set by a stage for generating the reference voltage made up of two MOSFETs $M_1$ and $M_2$ set cascaded with the gate and drain terminals in common. In particular, the transistor $M_1$ is an n-channel transistor and the transistor $M_2$ is a p-channel transistor. The source terminal of the transistor $M_2$ is connected to a voltage $V_{DD}$, and the source terminal of the transistor $M_1$ is connected to ground.

The voltage Vref is equal to the voltage between the gate and the source across the transistor $M_1$.

In particular then, the current $I_{LASER}$ is the sum of the biasing current $I_B$ defined by the reference voltage Vref generated by the stage for generating the reference voltage and of the modulation current $I_m$ given by the voltage signal Vi at input.

The transistors $M_1$, $M_2$, $M_B$ bias the laser source below threshold value, i.e., in a condition of weak emission, close to zero (transmission of 0's) and the possible current injected in the circuit via the transistor $M_M$ sends the laser into the emission state (transmission of 1's).

Other schemes can be used for providing the driver, such as for example schemes based upon current mirrors implemented either with short-channel devices or with long-channel devices, or else based upon an approach that exploits a differential pair.

In this embodiment, MOSFET technology is used, even though it is possible to use other technologies such as, for example, bipolar technology. The terms "source", "gate", and "drain", as used herein (also in the claims) in connection with FET technology are to be understood as comprehensive of the designations "emitter", "base", and "collector" referred to bipolar technology.

Figure 4:
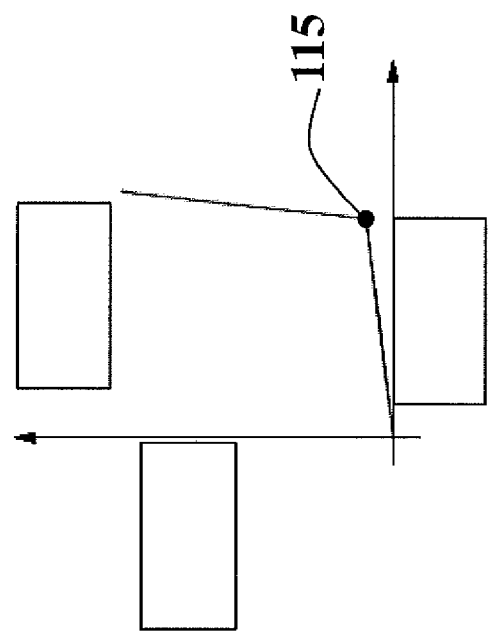

In FIG. 4, on the axis of the abscissae is represented the driving current, whilst on the axis of the ordinates is represented the output characteristic of the light emitted by the laser source. The abscissa of the point 115 of the broken-line characteristic indicates the threshold current of the device.

Figure 5:
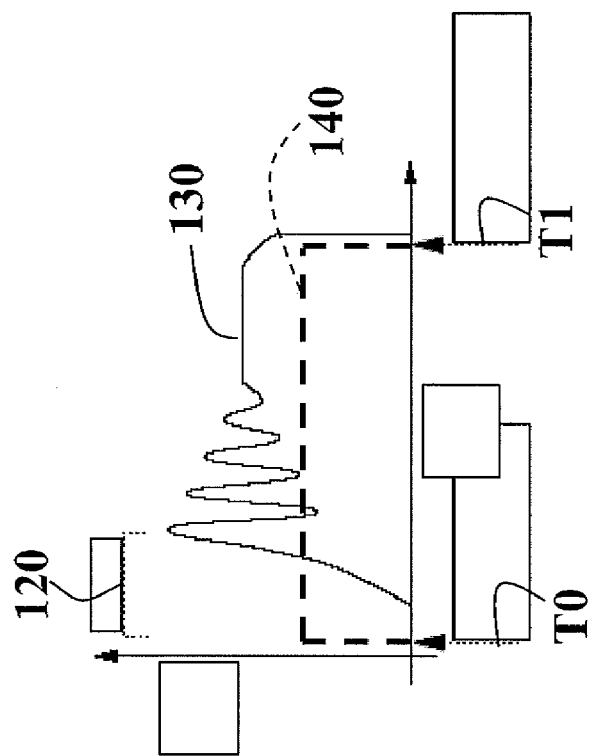
FIG. 4 and FIG. 5 show the turn-on delay of the driving current for the laser source of an embodiment.

The laser source is biased with a current higher than the threshold current so as to eliminate the turn-on delay 120 represented in FIG. 5. In FIG. 5, on the axis of the abscissae is represented the time, and on the axis of the ordinates is represented the output power. The laser source is turned on at time T0 and turned off at time T1, generating a driving-current pulse 140. The characteristic of the output power is represented by the curve designated by the reference number 130.

Since the value of the biasing current represents a factor with significant contribution in the energy expended by the emitter, the threshold current becomes a critical parameter.

In terms of static and dynamic energy consumption for the laser source, both the biasing current and the modulation current are to be considered.

Consequently, the total static and dynamic energy consumption of the optical transmitter increases linearly with the number of wavelengths to be generated.

In order to reduce the energy consumed by the emitter circuit, an alternative approach is to replace the on-chip laser with on-chip optical modulators, performing transmission of the optical information through modulation of an external laser beam appropriately coupled within the chip.

The solution described herein enables conversion of the SoC traffic, i.e., the traffic generated by CPUs, DMAs and by the real-time modules (for example, the audio/video blocks), which is in an electrical form, into traffic in an optical form, so that it will be suited for being transmitted on an optical network, in both systems-on-chip and systems-off-chip (as Multi-chip-Modules or Systems on Board).

The optical connections enable extensive exploitation of the properties of light, namely a greater bandwidth, immunity to noise and interference, WDM capacity, absence of problems of routing and/or congestion in the physical layer.

Figure 6:
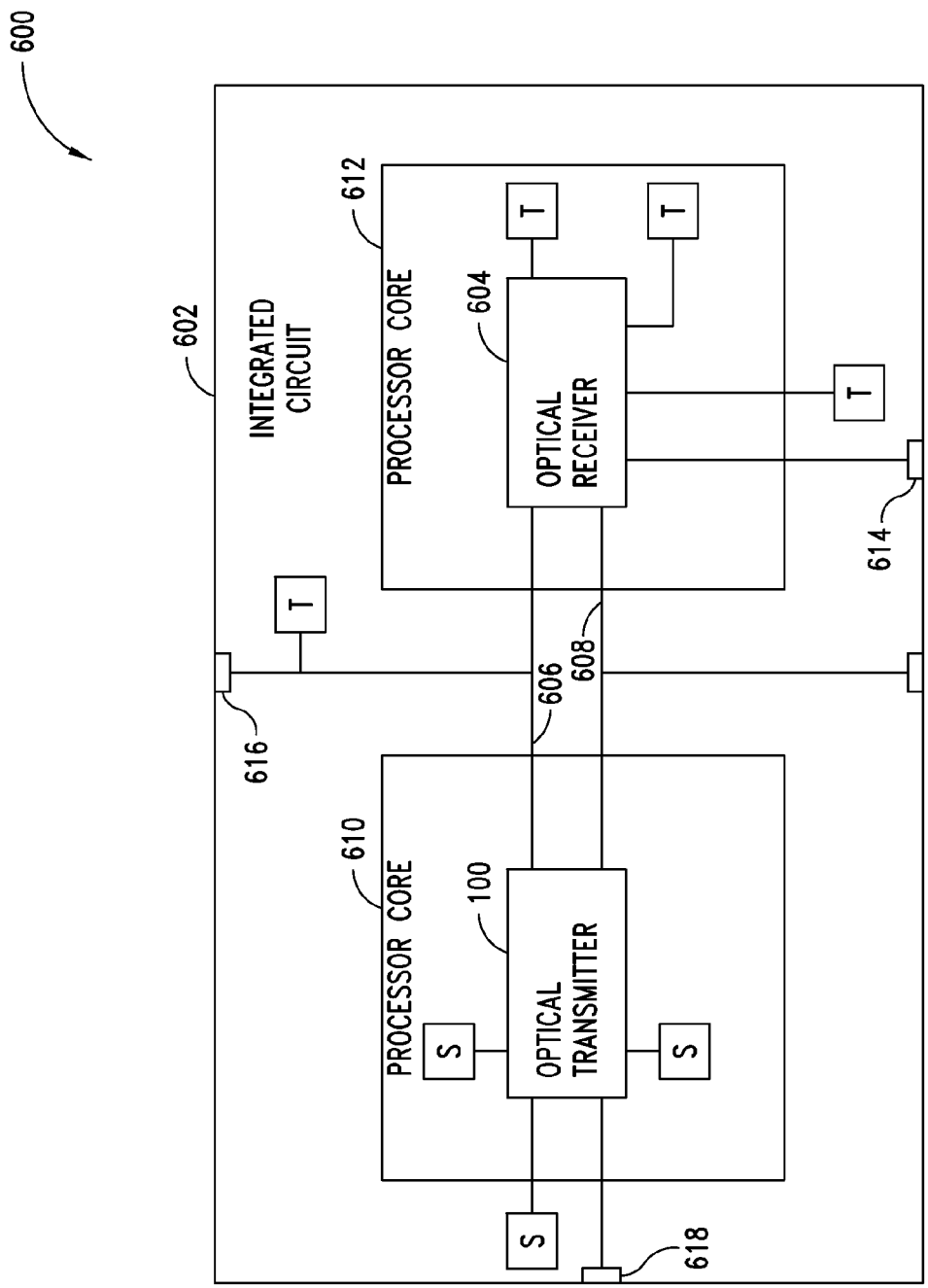
FIG. 6 shows an embodiment of a system including an embodiment of an optical transmitter and an optical receiver.

FIG. 6 illustrates an embodiment of a system 600 comprising a integrated circuit chip 602 having an embodiment of an optical transmitter 100 and an optical receiver 604 coupled together by an optical bus 606, such as a waveguide, and by an electrical bus 608. As illustrated, the transmitter 100 is part of a first processing core 610 and the receiver 602 is part of a second processing core 612. Copending U.S. application Ser. No. 12/790,659, filed by Alberto Scandurra, et al., on the same day as the present application, May 28, 2010, and entitled "Optical Receiver," and which also claims priority to Italian Application Nos. TO2009A000472 and TO2009A000473, discloses embodiments of example receivers suitable for use in the embodiment of FIG. 6. As illustrated, the optical receiver 604 is coupled to a plurality of targets T, some of which are part of the second processor core 612 and some of which are not part of the second processor core 612. The optical receiver 604 may also couple to an off-chip target, for example through a node 614. The optical bus 606 also couples the transmitter 100 to another on-chip target T, which may include another optical receiver. The transmitter may also be coupled to off-chip targets, for example through the waveguide 606 and a node 616. The transmitter also is coupled to one or more sources S, which as illustrated include sources in the first processor core 610 and a source outside the first processor core, and may be coupled to off-chip sources, for example through the node 618.

The use of an optical connection can be easily identified in the case of an on-board off-chip communication, whereas, in the case of SoCs or SiPs, however, merely "opening" the package of the receiver it may not make it possible to glean anything as regards the micro-architecture of the optical receiver.

Without prejudice to the principle of the disclosure, the details of construction and the embodiments may hence vary, even considerably, with respect to what is illustrated herein purely by way of example, without thereby departing from the scope of the disclosure, as defined by the annexed claims.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transmitter, comprising:
a destination decoder configured to identify, for packets in packet traffic received in input, a respective destination target in a plurality of targets in a communication network;
a plurality of emitting modules configured to convert electrical signals into optical signals of different wavelengths;
an optical bus inverter transmitter to implement a source coding on the electrical signals sent to said emitting modules; and
a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder.

2. The transmitter of claim 1, including a serialization module provided upstream of said de-multiplexer and configured to transform the packet traffic into a serial stream of bits.

3. The transmitter of claim 1 wherein said targets are included in on-chip and off-chip systems.

4. The transmitter of claim 1 wherein said optical bus inverter includes:
an inversion module configured to invert the signal received in input;
a comparator module configured to:
compare the signal received in input with the inverted signal present at the output of said inversion module;
choose as the signal to be transmitted the compared signal that contains a lower number of bits at a logic level "1"; and
outputting an inversion signal, whose logic level is indicative of the signal to be transmitted; and
a selector module configured to outputting the signal indicated by said inversion signal.

5. The transmitter of claim 4 wherein said comparator module performs the comparison between the signals along a following criteria:
if the signal to be transmitted was digitized from a most significant bit, then each bit is analyzed;
while the analyzed bits are at the logic level "0", nothing happens and scanning continues;
once a bit at a logic level "1" is detected, this bit is left unchanged and is considered as a marker;
from a next bit to an end of the scanning, all bits are inverted.

6. The transmitter of claim 1 wherein said transmitter is a system on-chip.

7. A transmitter, comprising:
a destination decoder configured to identify, for packets in packet traffic received in input, a respective destination target in a plurality of targets in a communication network;
a plurality of emitting modules configured to convert electrical signals into optical signals of different wavelengths; and
a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder, wherein said emitting modules comprise an optical emitter driven by a driver including:
a differential stage with two MOSFET transistors to modulate a current of the optical emitter based on a potential difference between an input voltage and a reference voltage; and
a stage configured to generate the reference voltage comprising two MOSFET transistors arranged in cascade with gate and drain terminals in common.

8. The transmitter of claim 7, including an optical bus inverter transmitter to implement a source coding on the electrical signals sent to said emitting modules.

9. The transmitter of claim 7 wherein said optical emitter comprises a laser diode.

10. The transmitter of claim 9 wherein said laser diode is biased with a current greater than a current threshold in order to address an ignition delay.

11. A system, comprising:
a communication network having a plurality of targets; and
an optical transmitter comprising:
means for identifying, for packets in packet traffic received in input, a respective destination target in the plurality of targets;
means for converting electrical signals into optical signals of different wavelengths; and
means for driving the means for converting based on the identifying, wherein the means for emitting comprises an optical emitter driven by a driver including:
a differential stage with two MOSFET transistors to modulate a current of the optical emitter based on a potential difference between an input voltage and a reference voltage; and
a stage configured to generate the reference voltage comprising two MOSFET transistors arranged in cascade with gate and drain terminals in common.

12. The system of claim 11 wherein the optical transmitter further comprises means for transforming packets in the packet traffic into serial streams of bits, coupled to the means for driving.

13. The system of claim 11 wherein the optical emitter comprises a laser diode.

14. The system of claim 13 wherein the means for emitting further comprises means for addressing an ignition delay.

15. The system of claim 11 wherein the optical transmitter is an on-chip transmitter and the targets include on-chip and off-chip targets.

16. A system, comprising:
a communication network having a plurality of targets; and
an optical transmitter comprising:
- means for identifying, for packets in packet traffic received in input, a respective destination target in the plurality of targets;
- means for converting electrical signals into optical signals of different wavelengths;
- means for driving the means for converting based on the identifying; and
- means for implementing a source coding on the electrical signals.

17. The system of claim 16 wherein the means for implementing a source coding comprises:
an inversion module configured to invert a signal received in input;
a comparator module configured to:
- compare the signal received in input with the inverted signal present at the output of said inversion module;
- choose as a signal to be transmitted the compared signal that contains a lower number of bits at a logic level "1"; and
- outputting an inversion signal, whose logic level is indicative of the signal to be transmitted; and
a selector module configured to outputting the signal indicated by said inversion signal.

18. The system of claim 16 wherein the means for emitting comprises an optical emitter driven by a driver including:
a differential stage with two MOSFET transistors to modulate a current of the optical emitter based on a potential difference between an input voltage and a reference voltage; and
a stage configured to generate the reference voltage comprising two MOSFET transistors arranged in cascade with gate and drain terminals in common.

19. A system, comprising:
a communication network having a plurality of targets; and
an optical transmitter comprising:
- a destination decoder configured to identify, for packets in packet traffic received in input, a respective destination target in the plurality of targets;
- a plurality of emitting modules configured to convert electrical signals into optical signals of different wavelengths;
- an optical bus inverter transmitter to implement a source coding on the electrical signals sent to said emitting module; and
- a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder.

20. The system of claim 19 wherein the transmitter includes a serialization module provided upstream of said de-multiplexer and configured to transform the packet traffic into a serial stream of bits.

21. The system of claim 19 wherein the transmitter is a system on-chip.

22. The system of claim 21 wherein said targets include on-chip and off-chip targets.

23. A system, comprising:
a communication network having a plurality of targets; and
an optical transmitter comprising:
- a destination decoder configured to identify, for packets in packet traffic received in input, a respective destination target in the plurality of targets;
- a plurality of emitting modules configured to convert electrical signals into optical signals of different wavelengths; and
- a de-multiplexer controlled by said destination decoder and configured to drive said emitting modules by selectively sending to each emitting module the electrical signals corresponding to a packet in said packet traffic in input according to the respective destination target in said plurality of targets identified by the destination decoder, wherein the emitting modules comprise an optical emitter driven by a driver including:
  - a differential stage with two MOSFET transistors to modulate a current of the optical emitter based on a potential difference between an input voltage and a reference voltage; and
  - a stage configured to generate the reference voltage comprising two MOSFET transistors arranged in cascade with gate and drain terminals in common.

24. The system of claim 23 wherein the transmitter includes an optical bus inverter transmitter to implement a source coding on the electrical signals sent to said emitting modules.

25. The system of claim 23 wherein said optical emitter comprises a laser diode.

26. A method comprising:
using an on-chip optical transmitter to:
- identify, for packets in packet traffic received in input, a respective destination target in a plurality of targets in a communication network;
- implement a source coding on electrical signals;
- convert the electrical signals into optical signals of different wavelengths; and
- control the conversion of a packet based on the identification of the respective destination target.

27. The method of claim 26, further comprising transforming packets in the packet traffic into serial streams of bits.

28. The method of claim 26 wherein the plurality of targets includes on-chip and off-chip targets.

* * * * *